US012574687B2

(12) United States Patent
Merks

(10) Patent No.: US 12,574,687 B2
(45) Date of Patent: Mar. 10, 2026

(54) ENVIRONMENTAL NOISE ESTIMATION AND REDUCTION BASED ON A CONSTRUCTED NOISE REFERENCE FROM A MULTI-MICROPHONE INPUT

(71) Applicant: Earlens Corporation, Menlo Park, CA (US)

(72) Inventor: Ivo L Merks, Eden Prairie, MN (US)

(73) Assignee: Earlens Corporation, Menlo Park, CA (US)

( * ) Notice: Subject to any disclaimer, the term of this patent is extended or adjusted under 35 U.S.C. 154(b) by 210 days.

(21) Appl. No.: 18/648,040

(22) Filed: Apr. 26, 2024

(65) Prior Publication Data

US 2024/0365073 A1 Oct. 31, 2024

Related U.S. Application Data

(60) Provisional application No. 63/499,190, filed on Apr. 28, 2023.

(51) Int. Cl.

*H04R 25/00* (2006.01)
*G10L 21/0208* (2013.01)
*G10L 21/0216* (2013.01)

(52) U.S. Cl.

CPC ........ *H04R 25/407* (2013.01); *G10L 21/0208* (2013.01); *H04R 25/353* (2013.01); *G10L 2021/02165* (2013.01); *H04R 2410/01* (2013.01)

(58) Field of Classification Search

CPC ........ H04R 1/222; H04R 1/245; H04R 1/326; H04R 1/406; H04R 3/005; H04R 25/407; H04R 25/405; H04R 25/353; H04R 2410/01; G10L 21/0208; G10L 2021/02165

See application file for complete search history.

(56) References Cited

U.S. PATENT DOCUMENTS

| | | | | |
|---|---|---|---|---|
| 9,491,543 | B1 * | 11/2016 | Konchitsky | G10L 21/0208 |
| 10,418,048 | B1 * | 9/2019 | Hutchins | H04R 1/105 |
| 2008/0253596 | A1 * | 10/2008 | Klinkby | H04R 25/407 381/313 |
| 2010/0246851 | A1 * | 9/2010 | Buck | G10L 21/0208 381/94.1 |
| 2023/0026692 | A1 * | 1/2023 | Bendtsen | H04R 25/505 |
| 2023/0034525 | A1 * | 2/2023 | Scheller | H04R 25/505 |
| 2024/0015449 | A1 * | 1/2024 | Dieudonné | H04R 25/405 |

* cited by examiner

*Primary Examiner* — Jason R Kurr
(74) *Attorney, Agent, or Firm* — Polsinelli PC

(57) ABSTRACT

Systems and techniques are provided for processing audio data. A process can include obtaining first audio data from a first microphone in a first direction, and second audio data from a second microphone in a second direction. A directional audio signal can be generated, comprising a weighted sum of an omni-directional signal corresponding to the first audio data and a bi-directional difference signal corresponding to the first audio data and the second audio data. A constructed noise reference can be generated based on a difference between the omni-directional signal and the bi-directional difference signal. Estimated noise information associated with one or more of the first microphone or the second microphone can be determined, based on the constructed noise reference.

20 Claims, 6 Drawing Sheets

ENVIRONMENTAL NOISE ESTIMATION AND REDUCTION BASED ON A CONSTRUCTED NOISE REFERENCE FROM A MULTI-MICROPHONE INPUT

CROSS-REFERENCE TO RELATED APPLICATIONS

This application claims the benefit of U.S. Provisional Patent Application No. 63/499,190, filed Apr. 28, 2023, which is hereby incorporated by reference, in its entirety and for all purposes.

FIELD

The present disclosure generally relates to audio signal processing. For example, aspects of the present disclosure relate to noise estimation and reduction using a multi-microphone array, and in particular relate to noise estimation and reduction in dynamic noise environments.

BACKGROUND

Hearing aids and other hearing devices can be worn to improve hearing by making sound audible to individuals with varying types and degrees of hearing loss. In addition to amplifying environmental sound to make it more audible to a hearing-impaired (HI) user, existing hearing aids may also implement various digital signal processing (DSP) approaches and techniques in an attempt to further improve the intelligibility of the amplified sound. In particular, many hearing aids may perform DSP in an attempt to improve the intelligibility of speech for HI users.

Improving the intelligibility of speech can be based at least in part on the simple amplification of environmental sound, such that the amplified sound is above the hearing thresholds of a user. However, sound perception and cognition can be significantly more complex than hearing thresholds alone. For instance, although hearing loss may typically begin at higher frequencies, listeners who are aware that they have hearing loss do not typically complain about the absence of high frequency sounds; instead, they report difficulties listening in a noisy environment and in hearing the details in a complex or noisy mixture of sounds. In some cases, off-frequency sounds may more readily mask auditory information with energy in other frequencies for HI individuals.

As hearing deteriorates, the signal-conditioning capabilities of the ear begin to break down, and thus HI listeners may expend greater mental effort to make sense of sounds of interest in complex acoustic scenes, or may miss the information entirely. A raised threshold in an audiogram is not merely a reduction in aural sensitivity, but often a result of the malfunction of some deeper processes within the auditory system that has implications beyond the detection of faint sounds. As such, many hearing aid users still struggle to use hearing aids in noisy environments.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for processing one or more audio samples. According to at least one illustrative example, a method for processing audio data is provided, the method including: obtaining first audio data from a first microphone associated with a first direction, and obtaining second audio data from a second microphone associated with a second direction; generating a directional audio signal comprising a weighted sum of an omni-directional signal corresponding to the first audio data and a bi-directional difference signal corresponding to the first audio data and the second audio data; generating a constructed noise reference based on a difference between the omni-directional signal and the bi-directional difference signal; and determining estimated noise information associated with one or more of the first microphone or the second microphone, wherein the estimated noise information is determined based on the constructed noise reference.

In some aspects, the bi-directional difference signal is determined based on one or more of: a difference between the second audio data from the second microphone and the first audio data from the first microphone, or a difference between a respective scaled or amplified representation of the second audio data and a respective scaled or amplified representation of the first audio data.

In some aspects, the method further comprises integrating the bi-directional difference signal over a configured time window to thereby generate an integrated bi-directional difference signal information, wherein the configured time window associated with the integration corresponds to an update periodicity for the constructed noise reference signal.

In some aspects, the update periodicity is less than 3 milliseconds.

In some aspects, the omni-directional signal is generated based on: applying a configured omni-directional scaling factor to the first audio data, to thereby obtain a scaled first audio data; and processing the scaled first audio data using a variable gain amplifier configured with an omni-directional microphone weighting, to thereby generate the omni-directional signal.

In some aspects, the omni-directional microphone weighting used to configure the variable gain amplifier is determined based on a joint optimization between a representation of the first audio data associated with the first microphone, and a representation of the second audio data associated with the second microphone.

In some aspects, the representation of the first audio data and the scaled first audio data are the same; and the representation of the second audio data comprises an integrated version of the bi-directional difference signal over a configured time window.

In some aspects, the constructed noise reference comprises a weighted difference between an amplified version of the omni-directional signal and an amplified version of the bi-directional difference signal.

In some aspects, the constructed noise reference is generated with a null sensitivity in a direction corresponding to one or more of: the first direction associated with the first microphone and the first audio data, or an expected direction of a target speaker.

In some aspects, the directional audio signal is associated with a directional sensitivity pattern oriented in a first direction, and wherein the constructed noise reference is associated with the same directional sensitivity pattern oriented in a second direction opposite from the first direction.

In some aspects, the directional audio signal is associated with a first directional sensitivity pattern and the constructed noise reference is associated with a second directional sensitivity pattern different from the first directional sensitivity pattern.

In some aspects, the method further comprises: determining a sensitivity difference between the first directional sensitivity pattern associated with the directional audio signal and the second directional sensitivity pattern associated with the constructed noise reference; and applying a correction to one or more of the directional audio signal or the constructed noise reference, based on the determined sensitivity difference.

In some aspects, determining the estimated noise information includes: determining a directional signal variance based on a frequency spectrum of the directional audio signal; and determining a noise reference variance based on a frequency spectrum of the constructed noise reference, wherein the directional signal variance and the noise reference variance are estimated in parallel or are estimated in series.

In some aspects, determining the estimated noise information further includes: comparing a variance difference between the directional signal variance and the noise reference variance to a configured threshold value; and configuring a variance threshold value of a phoneme detector based on the comparison, wherein: a relatively large variance difference corresponds to configuring a relatively low variance threshold value of the phoneme detector, and a relatively small variance difference corresponds to configuring a relatively high variance threshold value of the phoneme detector.

In some aspects, the relatively large variance difference between the directional signal variance and the noise reference variance is indicative of a presence of speech information from a target speaker or speech source located in the first direction.

In some aspects, determining the estimated noise information comprises performing smoothing of a weighted sum of the frequency spectrum of the directional audio signal with the frequency spectrum of the constructed noise reference to thereby generate the estimated noise information; and a weight associated with the frequency spectrum of the directional audio signal within the weighted sum is inversely proportional to the directional signal variance.

In some aspects, the method further comprises: determining one or more smoothing coefficients based on one or more of the directional signal variance, the noise reference variance, or the variance threshold value; and further configuring the phoneme detector using the determined one or more smoothing coefficients.

In some aspects, the method further comprises: recursively updating the estimated noise information to thereby generate updated estimated noise information, wherein the recursively updating is based on the weighted sum and the determined one or more smoothing coefficients.

In some aspects, the first microphone is a front-facing microphone of a hearing device, and the first direction is a front direction of the hearing device; and the second microphone is a rear-facing microphone of a hearing device, and the second direction is a rear direction of the hearing device.

In some aspects, the first microphone and the second microphone are included in a dual-microphone array of a hearing device or are included in a multi-microphone array of a hearing device comprising three or more microphones; the omni-directional signal is generated as a first combination of the first audio data and the second audio data, utilizing a first configured time delay value between the first audio data and the second audio data; and the bi-directional difference signal is generated as a second combination of the first audio data and the second audio data, utilizing a second configured time delay value between the first audio data and the second audio data.

In another illustrative example, an apparatus configured to process audio data is provided. The apparatus includes one or more memories configured to store the audio data and one or more processors coupled to the one or more memories. The one or more processors are configured to and can: obtain first audio data from a first microphone associated with a first direction, and obtaining second audio data from a second microphone associated with a second direction; generate a directional audio signal comprising a weighted sum of an omni-directional signal corresponding to the first audio data and a bi-directional difference signal corresponding to the first audio data and the second audio data; generate a constructed noise reference based on a difference between the omni-directional signal and the bi-directional difference signal; and determine estimated noise information associated with one or more of the first microphone or the second microphone, wherein the estimated noise information is determined based on the constructed noise reference.

In another illustrative example, a non-transitory computer-readable storage medium comprising instructions stored thereon which, when executed by at least one processor, causes the at least one processor to: obtain first audio data from a first microphone associated with a first direction, and obtaining second audio data from a second microphone associated with a second direction; generate a directional audio signal comprising a weighted sum of an omni-directional signal corresponding to the first audio data and a bi-directional difference signal corresponding to the first audio data and the second audio data; generate a constructed noise reference based on a difference between the omni-directional signal and the bi-directional difference signal; and determine estimated noise information associated with one or more of the first microphone or the second microphone, wherein the estimated noise information is determined based on the constructed noise reference.

In another illustrative example, an apparatus is provided. The apparatus includes: means for obtaining first audio data from a first microphone associated with a first direction, and obtaining second audio data from a second microphone associated with a second direction; means for generating a directional audio signal comprising a weighted sum of an omni-directional signal corresponding to the first audio data and a bi-directional difference signal corresponding to the first audio data and the second audio data; means for generating a constructed noise reference based on a difference between the omni-directional signal and the bi-directional difference signal; and means for determining estimated noise information associated with one or more of the first microphone or the second microphone, wherein the estimated noise information is determined based on the constructed noise reference.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures.

DETAILED DESCRIPTION

Figure 1:
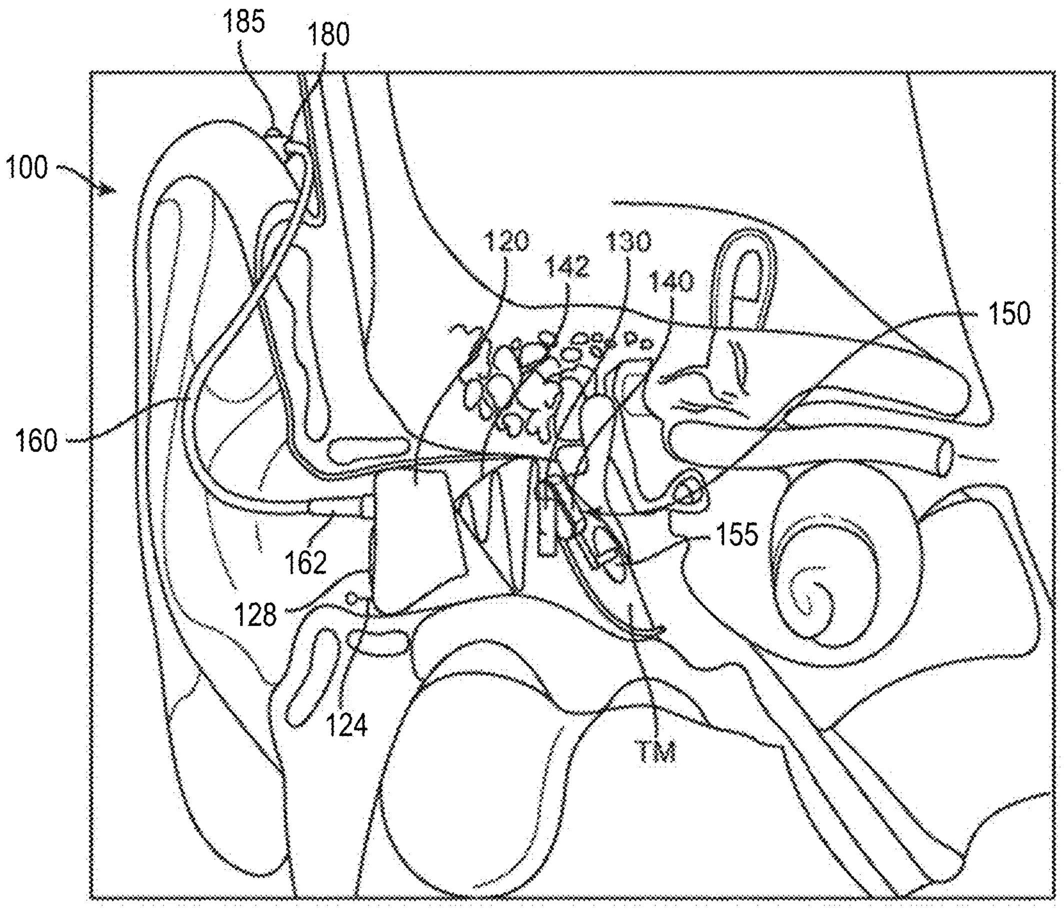
FIG. 1 is a cutaway view of an ear canal showing a contact hearing system wherein at least a portion of the contact hearing system is positioned in the ear canal, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

In some aspects, one or more of the apparatuses described herein is, is part of, and/or includes a mobile device or wireless communication device (e.g., a mobile telephone or other mobile device), an extended reality (XR) device or system (e.g., a virtual reality (VR) device, an augmented reality (AR) device, or a mixed reality (MR) device), a wearable device (e.g., a network-connected watch or other wearable device), a camera, a personal computer, a laptop computer, a vehicle or a computing device or component of a vehicle, a server computer or server device, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor.

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or Mel scale subband).

FIG. 1 is a cutaway view of an ear canal showing an example contact hearing system 100 that may be utilized to implement aspects of the present disclosure, wherein at least a portion of the contact hearing system 100 is positioned in the ear canal. In some examples, contact hearing system 100 may also be referred to as a "smartlens system" or "smartlens". As illustrated, contact hearing system 100 can be implemented based on using electromagnetic waves to transmit information and/or power from an ear tip 120 to a contact hearing device 150.

In one illustrative example, contact hearing system 100 can be implemented based on using inductive coupling to transmit information and/or power from ear tip 120 to contact hearing device 150. The contact hearing system 100 can include one or more audio processors 180. The audio processor 180 can include or otherwise be associated with one or more microphones 185. As illustrated in the example of FIG. 1, the microphone 185 can be an external microphone (e.g., external to the ear canal and/or external to a housing of the contact hearing system 100).

Audio processor 180 may be connected to (e.g., communicatively coupled to) an ear tip 120 for providing bidirectional transmission of information-bearing signals. In some embodiments, a cable 160 is used to couple audio processor 180 and ear tip 120. The cable 160 can be used to implement the bidirectional transmission of information-bearing signals, and in some cases, may additionally or alternatively be used to provide electrical power to or from one or more components of the contact hearing system 100. In some cases, the contact hearing system 100 can perform energy harvesting to obtain power (e.g., at the contact hearing device 150 within the ear canal of the user) from the same information-bearing signals that are used to provide audio information to the contact hearing device 150.

A taper tube 162 can be used to support cable 160 at ear tip 120. Ear tip 120 may further include one or more canal microphones 124 and at least one acoustic vent 128. Ear tip 120 may be an ear tip which radiates electromagnetic (EM) waves 142 in response to signals from audio processor 180. Electromagnetic signals radiated by ear tip 120 may be received by contact hearing device 150, which may comprise receive coil 130, micro-actuator 140, and umbo platform 155.

The receive coil 130 of contact hearing device 150 can receive the EM signals radiated from ear tip 120 and, in response, generates an electrical signal corresponding to the received EM signal radiated from ear tip 120. Receive coil 130 can subsequently transfer the electrical signal to the micro-actuator 140. In particular, the electrical signal(s) at the receive coil 130 (e.g., received from/radiated by ear tip 120) can be used to drive the micro-actuator 140 to cause the user of the contact hearing system 100 to experience or perceive sound. In some embodiments, the micro-actuator 140 can be implemented as a piezoelectric actuator and/or the receive coil 130 can be implemented as a balanced armature receiver. The micro-actuator 140 (e.g., piezoelectric actuator) can convert the electrical transmission to mechanical movements and acts upon a tympanic membrane (TM) of the user. In one illustrative example, the contact hearing device 150 is positioned within an ear canal of the user such that the micro-actuator 140 is in contact with a surface of the tympanic membrane (TM) of the user. In some aspects, the micro-actuator 140 acts upon the tympanic membrane (TM) via an umbo platform 155.

In many embodiments, a device to transmit an audio signal to a user may comprise a transducer assembly comprising a mass, a piezoelectric transducer, and a support to support the mass and the piezoelectric transducer with the eardrum. For instance, the contact hearing system 100 can be implemented or configured as a device to transmit an audio signal to a user. The transducer assembly can be the same as, similar to, and/or can include the contact hearing device 150 of FIG. 1. For instance, the piezoelectric transducer mentioned above can be the same as or similar to the micro-actuator 140 of FIG. 1; and the support can be the same as or similar to the umbo platform 155 of FIG. 1.

The piezoelectric transducer (e.g., micro-actuator 140) can be configured to drive the support (e.g., umbo platform 155) and the eardrum (e.g., tympanic membrane, TM) with a first force and the mass with a second force opposite the first force. This driving of the eardrum and support with a force opposite the mass can result in more direct driving of the eardrum, and can improve coupling of the vibration of transducer to the eardrum. The transducer assembly device may comprise circuitry configured to receive wireless power and wireless transmission of an audio signal, and the circuitry can be supported with the eardrum to drive the transducer in response to the audio signal, such that vibration between the circuitry and the transducer can be decreased. The wireless signal may comprise an electromagnetic signal produced with a coil, or an electromagnetic signal comprising light energy produced with a light source. In at least some embodiments, at least one of the transducer or the mass can be positioned on the support away from the umbo of the ear when the support is coupled to the eardrum to drive the eardrum, so as to decrease motion of the transducer and decrease user perceived occlusion, for example, when the user speaks. This positioning of the transducer and/or the mass away from the umbo, for example, on the short process of the malleus, may allow a transducer with a greater mass to be used and may even amplify the motion of the transducer with the malleus. In at least some embodiments, the transducer may comprise a plurality of transducers to drive the malleus with both a hinging rotational motion and a twisting motion, which can result in more natural motion of the malleus and can improve transmission of the audio signal to the user.

Further details regarding the systems and techniques will be described with respect to the figures.

As mentioned previously, hearing aids and other hearing devices can be worn to improve hearing by making sound audible to individuals with varying types and degrees of hearing loss. In addition to amplifying environmental sound to make it more audible to a hearing-impaired (HI) user, existing hearing aids may also implement various digital signal processing (DSP) approaches and techniques in an attempt to further improve the intelligibility of the amplified sound. In particular, many hearing aids may perform DSP in an attempt to improve the intelligibility of speech and/or the comfort of the listener (e.g., HI users and/or various other listeners, etc.). Improving the intelligibility of speech can be based at least in part on the simple amplification of environmental sound, such that the amplified sound is above the hearing thresholds of a user. However, sound perception and cognition can be significantly more complex than hearing thresholds alone. For instance, although hearing loss may typically begin at higher frequencies, listeners who are aware that they have hearing loss do not typically complain about the absence of high frequency sounds; instead, they report difficulties listening in a noisy environment and in hearing the details in a complex or noisy mixture of sounds. In some cases, off-frequency sounds may more readily mask auditory information with energy in other frequencies for HI individuals.

In some examples, hearing aids can be configured to reduce noise (e.g., undesired and/or background noise, etc.) using a dual-microphone array followed by single-channel post-filter. For example, the dual-microphone array can include first and second microphones located with a known separation distance or geometry between the microphones. Based on the known spatial separation between the two microphones, DSP techniques can be used to reduce non-target portions of the captured audio data obtained by the dual-microphone array. For example, the dual-microphone array can be configured to reduce noise(s) coming from the sides and back of the hearing aid user, while leaving the target speech (e.g., coming from the front of the hearing aid user) intact. In particular, a dual-microphone array can be used to implement a beamformer that selectively captures a targeted portion of the sound field. In the example above of a dual-microphone array of a hearing aid, a beamformer can selectively capture the forward portion of the sound field.

The beamformer can be implemented using beamforming and/or various other spatial filtering techniques that enable the selective capture of a targeted portion of the sound field, while rejecting or attenuating the non-targeted portion(s) of the sound field. Beamforming can be implemented based on applying different weights to the respective audio signals captured by each microphone in the array. The specific weight values can be pre-determined or otherwise configured based on the desired direction of the target speech (e.g., front) and/or the expected direction of the non-target noise or other sounds (e.g., back, sides, etc.). By adjusting the respective weights for the audio signals captured from each microphone in the array, the beamformer can constructively combine audio from the desired or target direction (e.g., front) while destructively combining the signals emanating from the noise directions (e.g., back and sides).

A single-channel post-filter can be applied to the beamformer output and may, for example, be utilized for purposes of further noise reduction, enhancing speech clarity, etc. The post-filter can apply or otherwise perform time-dependent filtering of the beamformer output. For instance, the single channel post-filter can be configured to attenuate frequencies with a poor (e.g., relatively low) signal-to-noise ratio (SNR). The true SNR represented in the beamformer output is unknown, but can be estimated based on comparing the envelope of the beamformer output signal to an estimate of the noise. More particularly, the post-filter can estimate the noise in the signal as the portion of the signal that does not resemble speech.

Existing approaches are often based on an assumption that the noise estimate is the more slowly varying portion of the signal, while the speech portion of the signal varies more rapidly. Accordingly, the post-filter is typically configured to reduce only the slowly varying parts of the signal (e.g., of the beamformer output) while passing the more rapidly varying parts of the signal, based on an assumption that uses the slowly varying signal components as a proxy for noise.

As such, existing approaches to noise reduction and/or related nose reduction DSP techniques for hearing aids and other hearing devices may reduce only noise that is slowly varying, while providing little benefit in dynamic noise environments (such as restaurants, parties, and various other situations where many talkers are present) in which the noise to be suppressed contains both slowly and rapidly varying parts. There is a need for systems and techniques that can be used to provide noise estimation and/or noise reduction for dynamic noise (e.g., noise that contains both slowly and rapidly varying parts) and/or that can otherwise be effectively used to provide noise estimation and noise reduction in dynamic noise environments where the assumption of slowly varying signal components as a proxy noise becomes unreliable or incomplete.

As described in more detail herein, disclosed are systems, apparatuses, methods, and computer-readable media (collectively referred to as "systems and techniques") that can be used to perform noise estimation and/or noise reduction for dynamic noise, such as noise that contains both slowly and rapidly varying noise components. In one illustrative example, the systems and techniques can be used to perform noise estimation and/or noise reduction using a multi-microphone array or other multi-microphone input corresponding to a source of dynamic noise that contains slowly and rapidly varying parts. For instance, the multi-microphone array may be provided as a dual-microphone array and/or adaptive dual microphone (ADM) array, which in some embodiments can be included in or implemented by a hearing aid or other hearing device (e.g., such as the contact hearing device 100 of FIG. 1, etc.).

Figure 2:
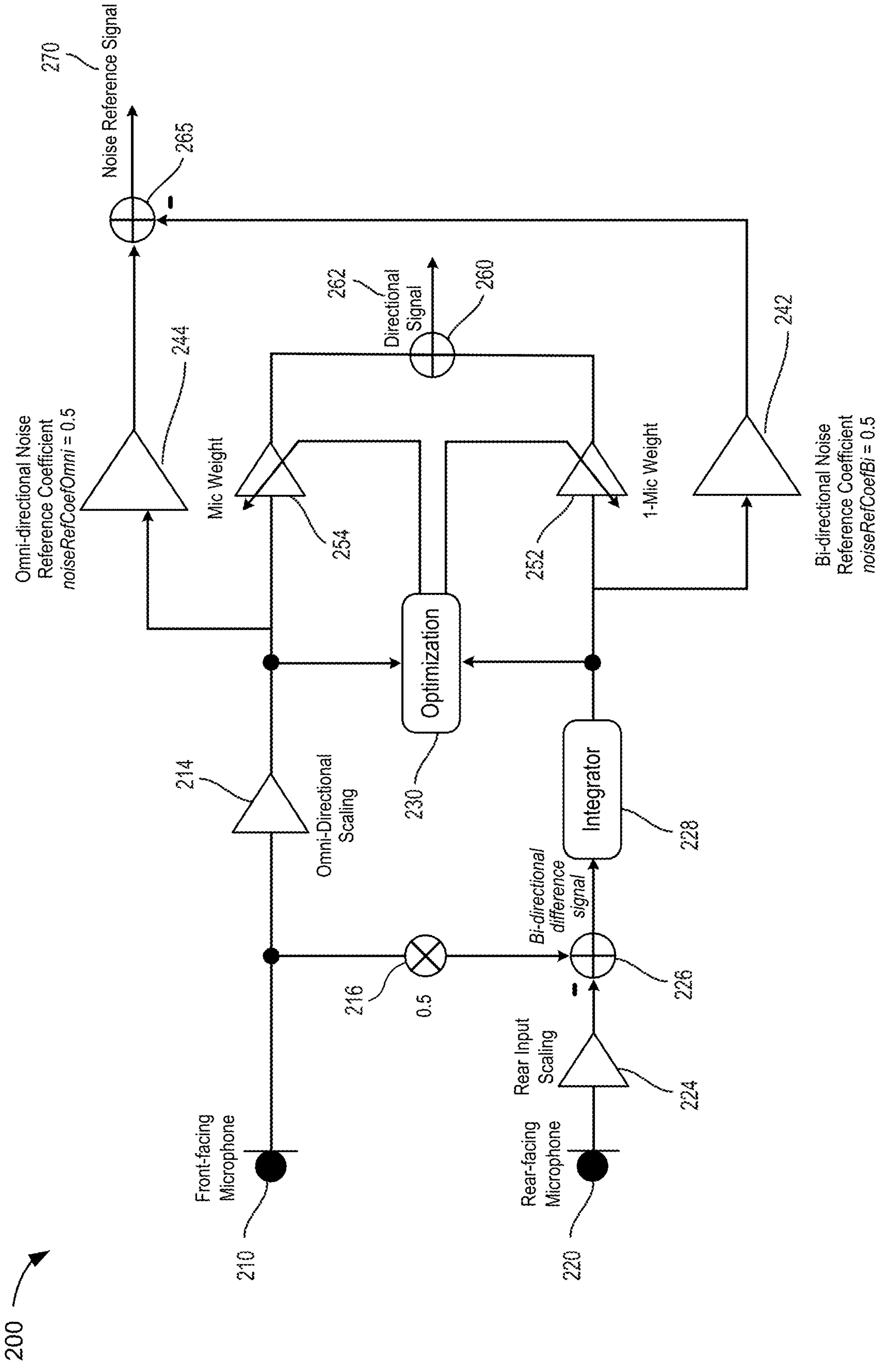
FIG. 2 is a diagram illustrating an example of a dual-microphone array and an associated noise reference signal determined using the dual-microphone array, in accordance with some examples.

FIG. 2 is a diagram illustrating an example of an audio processing system 200 including a dual-microphone array (e.g., comprising a first microphone 210 and a second microphone 220) that can be used to generate a noise reference signal 270 (e.g., also referred to herein as a noise estimation or noise estimate). In one illustrative example, the noise reference signal 270 can be used to implement noise reduction and/or other audio processing techniques to enhance a target portion of the input audio data captured by the first and second microphones 210 and 220, respectively. In some aspects, the first and second microphones 210, 220 can be included in a contact hearing device, such as the contact hearing device 100 of FIG. 1, etc. The relative position or location information (and/or the absolute position or location information) of each microphone 210, 220, etc., included in the audio processing system 200 can be pre-determined or otherwise known or available.

In some embodiments, the first microphone 210 can be provided as a front-facing microphone or a microphone with increased gain or sensitivity in the front direction; the second microphone 220 can be provided as a rear-facing microphone or a microphone with increased gain or sensitivity in the rear direction (e.g., the opposite direction from that of the front-facing microphone 210). In some aspects, the first microphone 210 can be referred to interchangeably as a "front microphone," "front-facing microphone," and/or "frontMic," etc. The second microphone 220 can be referred to interchangeable as a "rear microphone," "rear-facing microphone," and/or "rearMic," etc. In some examples, the audio processing system 200 can include or implement a microphone array with a greater number of microphones (e.g., a greater number of microphones than the two microphones 210 and 220 shown in the example of a dual-microphone array depicted in FIG. 2), without departing from the scope of the present disclosure. In some embodiments, the front and rear microphones 210 and 220 (respectively) can be included in or otherwise used to implement an adaptive dual microphone (ADM) array, as mentioned above. The front and rear microphones 210, 220 may be the same as or similar to one another or may be provided as different types of microphones.

In some aspects, the output of the dual microphone array (e.g., comprising the front-facing microphone 210 and the rear-facing microphone 220) can be a directional signal 262, generated as a weighted sum or weighted combination of a respective first signal obtained by processing audio data from the front-facing microphone 210 using a first branch of the audio processing system 200 and a respective second signal obtained by processing audio data from the rear-facing microphone 220 and the front-microphone 210 using a second branch of the audio processing system 200.

In some cases, the front microphone 210 and the rear microphone 220 can be used to implement a forward-facing microphone system (with a forward facing or front-oriented directional response pattern), and can additionally be used to implement a rear-facing microphone system (with a rear facing or rear-oriented directional response pattern, different from and/or opposite to that of the forward-facing microphone system). For instance, the first audio data obtained from the front microphone 210 and the second audio data obtained from the second microphone 220 can be processed using different time delay values (e.g., time delay or time offset applied to one of the front microphone 210 or rear microphone 220) to thereby obtain either the forward-facing directional response pattern for the forward-facing microphone system or the rear-facing directional response pattern for the rear-facing microphone system.

The forward-facing directional response pattern can correspond to the omni-directional signal, and the rear-facing directional response pattern can correspond to the bi-directional signal, as noted above. In some aspects, the forward-facing and the rear-facing directional response patterns can be generated simultaneously (e.g., in parallel) based on processing the same audio data from the first and second microphones 210, 220 using different time delay values applied therebetween. Different time delay values used for combining the first audio data from the front microphone 210 with the second audio data from the rear microphone 220 can correspond to various different directional response patterns and/or directionality thereof.

For example, a particular directional response pattern can be generated based on applying a corresponding or particular configured time delay value to either the front microphone 210 signal or the rear microphone 220 signal. Applying the configured time delay to one of the front microphone 210 signal or the rear microphone 220 signal can invert the phase of that microphone signal. Subsequently summing the time delayed signal from one microphone of the pair 210, 220 with the non-time delayed signal from the remaining microphone of the pair 210, 220 can result in the generation of the desired directional response pattern. For example, applying a particular time delay value to the rear microphone 220 signal and combining with the non-delayed front microphone 210 signal can cause sounds arriving from the direction of the front microphone 210 to be combined constructively across the front microphone 210 data and the appropriately time delayed rear microphone 220 data (e.g., the time delay value applied to to the rear microphone 220 can be selected based on the propagation speed of sound and the distance between the rear microphone 220 and the front microphone 210, such that the time delay shifts or aligns the rear microphone 220 data to constructively combine with the front microphone 210 data for sounds originating/arriving from the direction of the front microphone 210). The sounds arriving from the direction of the front microphone 210 combine constructively with the corresponding representation of that same sound, as captured by the rear microphone 220 and then time delay shifted into constructive alignment with the front microphone 210 signal. Accordingly, sounds arriving from the direction of the front microphone 210 pass through the combined signal resulting from the combination of the original front microphone 210 signal with the time delayed rear microphone 220 signal, and can be used to generate the omni-directional signal referred to herein.

Similarly, when applying the time delay to the rear microphone 220 signal, sounds that originate in or arrive from the rear (e.g., from the direction of the rear microphone 220), will be shifted by the application of the time delay to combine destructively and cancel with the corresponding representation of the same sound(s) as captured by the front microphone 210 signal.

Based on varying the configured time delay value applied between the front microphone 210 signal and the second microphone 220 signal (e.g., either applying the entire time delay to either the front microphone 210 signal or the rear microphone 220 signal, or applying a first portion of the time delay to the front microphone 210 signal and applying a second/remaining portion of the time delay to the rear microphone 220 signal), the systems and techniques can use the front and rear microphone 210, 220 signals to generate various different directional response patterns (e.g., including, but not limited to, the omnidirectional signal and/or the bidirectional signals described herein; a cardioid pattern; a super-cardioid pattern; a hyper cardioid pattern; a dipole pattern; etc.).

In one illustrative example, the directional signal 262 is generated as a weighted sum or combination of an omni-directional signal obtained by processing the audio data from the front-facing microphone 210 using at least the omni-directional scaling 214 and microphone weighting 254, and a bi-directional signal obtained by processing a difference signal (e.g., obtained at block 226 as the difference between the rear-facing microphone 220 audio data and the front-facing microphone 210 audio data) using at least an integrator 228 and a 1-mic weighting 252. In some aspects, the microphone weighting 254 applied to the audio data from the front-facing microphone 210 can correspond to a first adjustable or variable gain amplifier 254, where adjusting the variable gain corresponds to adjusting the microphone weighting. Similarly, the 1-mic weighting 252 applied to the lower branch audio data from the rear-facing microphone 220 can correspond to a second adjustable or variable gain amplifier 252, where adjusting the variable gain corresponds to adjusting the 1-mic weight.

As illustrated, the front microphone 210 can be used to capture and/or generate as output an omni-directional signal associated with the front-facing direction (e.g., an omni-directional signal associated with a direction or directionality of the front-facing microphone 210). In some examples, audio data captured or obtained using the front microphone 210 can be scaled or weighted using an omni-directional scaling factor 214. The omni-directional scaling factor 214 can be a pre-determined or otherwise configured scaling factor for adjusting the omni-directional signal output by the front-facing microphone 210. In some examples, the omni-directional scaling factor 214 can be dynamically and/or automatically determined and/or adjusted during the process of generating the output noise reference signal 270 (e.g., in some cases, the omni-directional scaling factor can be dynamically determined and/or adjusted by the audio processing system 200, or device implementing the audio processing system 200, etc.).

Based on the original front-facing omni-directional signal captured by the front microphone 210, the audio processing system 200 can apply or otherwise perform the omni-directional scaling 214 to generate an intermediate signal comprising a scaled omni-directional signal. The scaled omni-directional signal associated with the front-facing microphone 210 and the omni-directional scaling 214 can subsequently be provided as input to an optimization engine 230 of the audio processing system 200, which will be described in greater depth below.

The rear-facing microphone 220 can be processed by a second branch of the audio processing system 200 (e.g., the lower branch, in the example depicted in FIG. 2) to generate a bi-directional signal corresponding to a difference between the audio data captured by the rear-facing microphone 220 and the audio data captured by the front-facing microphone 210. In other words, a bi-directional signal can be generated based on the front microphone 210 and the rear microphone 220 (or vice versa). For instance, the bi-directional signal can be associated with the respective direction or directionality of front microphone 210 (e.g., a first/front-facing direction) and the respective direction or directionality of rear microphone 220 (e.g., a second/rear-facing direction). In particular, the bi-directional signal can be determined as a difference between the rear-facing microphone 220 audio data and the front-facing microphone 210 audio data. As illustrated in FIG. 2, the first audio data captured or obtained using the front microphone 210 can be subtracted from the corresponding (e.g., corresponding and/or synchronized in time, etc.) second audio data captured or obtained using the rear microphone 220.

In some embodiments, the bi-directional difference signal can be determined based on scaling one or more (or both) of the front microphone 210 audio data and/or the second microphone 220 audio data. For instance, FIG. 2 depicts an example wherein the first audio data from front microphone 210 is scaled according to or using a scaling operation 216 provided at or on the interconnection between the first (e.g., upper) branch associated with the front microphone 210 signal and the second (e.g., lower) branch associated with the rear microphone 220. In one illustrative example, the scaling operation 216 can apply a scaling factor of 0.5 to the signal output by the front-facing microphone 210, where the scaling factor value of 0.5 reduces the front microphone 210 signal by half. Various other scaling factors or scaling factor values (including a scaling factor value of 1, equivalent to not applying scaling) can also be used to configure the scaling operation 216 associated with generating the bi-directional difference signal used by the audio processing system 200 to generate the output noise reference signal 270.

The scaling operation 216 and corresponding scaling factor of 0.5 can be applied to the front-facing microphone 210 signal prior to the subtraction of the scaled front microphone 210 signal from the rear microphone 220 signal, which is performed at the difference operation 226. Additionally, in the example of FIG. 2, a rear input scaling factor 224 can be applied to the second audio data from second microphone 220, again prior to the difference operation 226. In some cases, the respective scaling factor(s) applied to the first and second audio data (from the first and second mics 210, 220, respectively) can be the same or can be different. In one illustrative example, the bidirectional difference signal generated as output by the difference operation 226 can be determined as (rear input scaling factor 224*rear microphone 220 signal)−(scaling factor 216*front microphone 210 signal).

The output of difference operation 226 (e.g., the bi-directional signal described above) can be provided to an integrator 228 included in the second (e.g., lower) audio processing branch of the audio processing system 200. In some aspects, the integrator 228 can be used to accumulate or sum the bi-directional difference signal over a configured or specified period of time. For example, the integrator 228 can maintain a running or cumulative total corresponding to or based on the bi-directional difference signal, beginning from a specified point in time (e.g., beginning from when the audio processing operations using audio processing system 200 were initiated, beginning from the start of the most recent/current time window or integration interval for which the integrator 228 performs the integration, etc.). In some aspects, the integrator 228 can generate an integrated output that corresponds to the input bi-directional signal from the difference operation 226, with low-frequency components emphasized. For example, the integrator 228 can emphasize low-frequency components of the input signal to the integrator, based on the accumulation process effectively acting as a low-pass filter to attenuate high-frequency components of the input signal (e.g., higher frequency components exhibit more rapid variations or oscillations over time, with positive and negative contributions tending to cancel each other out over the time period of the integration; while lower frequency components have slower variations that are more likely to accumulate constructively over time).

An optimization engine 230 can be provided downstream of the omni-directional scaling 214 on the upper branch of audio processing system 200 (associated with the front microphone 210) and the integrator 228 on the lower branch of audio processing system 200 (associated with the rear microphone 220). For example, the optimization engine 230 can be interconnected between the upper and lower processing branches, and configured to receive a first input comprising the scaled omni-directional front microphone signal generated by the omni-directional scaling 214, and a second input comprising the output of integrator 228 (e.g., the integration of the bi-directional difference signal between the front and rear microphones, as described above).

Based at least in part on the optimization operation(s) provided by the optimization engine 230, a directional signal 262 can be generated for the dual-microphone array (e.g., the microphone array comprising front microphone 210 and rear microphone 220), wherein the directional signal 262 comprises a weighted sum of the omni-directional signal from front microphone 210 and the bi-directional signal that is a difference between the front microphone 210 and rear microphone 220. For example, a first microphone weight factor or configured gain value for a variable/adjustable gain amplifier 254 can be determined or otherwise configured for the front microphone 210, and applied to the corresponding output from optimization engine 230 for the upper processing branch/front microphone 210. A second microphone weight factor or configured gain value for a variable/adjustable gain amplifier 252 can be determined or otherwise configured for the rear microphone 220, and applied to the corresponding output from optimization engine 230 for the lower processing branch/rear microphone 220. In another example, the first adjustable gain amplifier or weight factor 254 can be determined for the omni-directional signal associated with the upper audio processing branch of system 200, and the second adjustable gain amplifier or weight factor 252 can be determined for the bi-directional signal associated with the lower audio processing branch of system 200. After applying the first and second weight factors 254 and 252, using corresponding first and second adjustable or variable gain amplifiers (respectively), the directional signal 262 can generated as the weighted sum of the omni-directional and bi-directional signals, using the summation operation 260 to combine the weighted omni-directional signal after the first mic weight 254 is applied and the weighted bi-directional signal after the 1-mic weight 252 is applied.

In one illustrative example, the systems and techniques described herein can be used to additionally calculate or otherwise determine a noise reference signal 270, which can be generated and output by the audio processing system 200 in addition to the directional signal 262. For instance, the noise reference signal 270 can be constructed as the difference between the omni-directional signal and the bidirectional signal. As illustrated in FIG. 2, the omni-directional signal from the front microphone 210 can be split off prior to the first adjustable gain amplifier weight factor 254 (associated with generating the directional signal 262) and can be scaled or weighted using a separate noise reference coefficient 244. The noise reference coefficient 244 can correspond to the omni-directional signal and may also be referred to as an omni-directional noise reference coefficient (e.g., "noiseRefCoefOmni" in the example of FIG. 2).

A separate noise reference coefficient 242 can correspond to the bi-directional signal, and can be applied to the bi-directional signal branch, i.e., after the bi-directional signal is split off prior to the second adjustable gain amplifier weight factor 252 (associated with generating the directional signal 262). The noise reference coefficient 242 associated with the bi-directional difference signal can also be referred to as a bi-directional noise reference coefficient (e.g., "noiseRefCoefBi" in the example of FIG. 2). After weighting the omni-directional signal with the corresponding omni-directional noise reference coefficient 244, and weighting the bi-directional signal with the corresponding bi-directional noise reference coefficient 242, the noise reference signal 270 is calculated as the difference between the weighted omni-directional signal and the weighted bi-directional signal, for example using the difference operation 265 coupled to the outputs of the omni-directional noise reference coefficient amplification 244 and the bi-directional noise reference coefficient amplification 242.

In some aspects, the noise reference signal 270 (also referred to as the "noise reference") can be generated to have a null (e.g. low) sensitivity towards the front-facing direction corresponding to the front-facing microphone 210 and/or the target speech that is expected to come from the front-facing direction. Notably, the noise reference 270 can be generated with the null/low sensitivity towards the front-facing direction of the front-facing microphone 210, towards the direction that corresponds to the likely orientation of a target speaker, towards the direction that corresponds to a focus of the hearing aid wearer's attention (i.e., the front), etc. In some examples, the front-facing direction of the front microphone 210, the direction corresponding to the likely orientation of a target speaker, and the direction corresponding to a focus of the hearing aid wearer's attention can all be the same as or similar to one another.

Accordingly, by calculating the noise reference 270 to have a null sensitivity towards the front-facing direction (or other configured direction), the level of the target speaker's speech can be significantly reduced in the constructed noise reference 270. For example, based on generating the noise reference 270 with a null sensitivity towards the front or towards the direction of the target speaker, the representation of the target speaker's speech is reduced in level based on being located within the area or direction of null (e.g., low) sensitivity. In some aspects, by reducing the level of the target speaker's speech within the noise reference signal 270 that is generated as output by the audio processing system 200, the subsequent performance of noise reduction based on the noise reference signal 270 can result in less of the target speaker's audio being attenuated or otherwise reduced in a final output signal.) having noise reduction applied based on the noise reference 270 (e.g., a final output noise-reduced signal with ENR or other noise reduction techniques applied using the generated noise reference 270, etc.

In some embodiments and examples, the directional signal 262 and the noise reference signal 270 may have similar (but opposite facing) directional sensitivity patterns. For example, in some cases, the directional signal 262 can have a directional sensitivity pattern that is the same as or similar the respective directional sensitivity pattern associated with the noise reference signal 270, with an (approximately) 180-degree offset in direction between the two directional sensitivity patterns (e.g., the directional signal 262 can have a particular directional sensitivity pattern, in the front-facing direction; the noise reference signal 270 can have the same or similar particular directional sensitivity pattern but in the opposite, rear-facing direction).

In examples where the directional signal 262 and the constructed noise reference signal 270 have the same or similar, but opposite facing, directional sensitivity patterns, the level of the noise can also be similar in or across the directional signal 262 and the constructed noise reference 270 (e.g., particularly when the noise field is diffuse, which may occur approximately 95% of the time).

In some aspects, the directional signal 262 and the constructed noise reference 270 may have dissimilar directional sensitivity patterns, or may otherwise have respective directional sensitivity patterns that are not the same as or similar to one another. For example, the directional signal 262 can have a directional sensitivity pattern with a first shape and/or area, and facing or oriented towards a first direction; the constructed noise reference 270 can have a directional sensitivity pattern with a second shape and/or area (different from the first shape and/or area, respectively), and facing or oriented towards a second direction (different from the first direction, and not necessarily with a 180-degree offset such that the first and second directions are opposite facing with respect to one another).

In some embodiments, the systems and techniques described herein can include and/or implement one or more directional sensitivity pattern corrections, adjustments, and/or normalization operations to compensate for any differences or dissimilarities between the respective directional sensitivity pattern associated with the directional signal 262 and the respective directional sensitivity pattern associated with the constructed noise reference 270. In some aspects, the directional sensitivity pattern correction can be applied to a particular or selected one of either the directional signal 262 or the constructed noise reference 270, such that the corrected signal has a corrected directional sensitivity pattern that is the same as or similar to the un-corrected directional sensitivity pattern of the un-corrected signal of the pair. In another example, directional sensitivity pattern corrections can be applied to both the directional signal 262 and the constructed noise reference 270, such that the corrected directional signal 262 and the corrected constructed noise reference 270 share a same (or similar) corrected directional sensitivity pattern, but in opposite facing directions. For instance, in some embodiments, the audio processing system 200 depicted in FIG. 2 may further include one or more directional sensitivity pattern corrections/compensations or directional sensitivity pattern correction/compensation engines that are configured to automatically provide correction(s) for any sensitivity differences that may be present between a first directional sensitivity pattern associated with the directional signal 262 when left un-corrected, and a second directional sensitivity pattern associated with the constructed noise reference signal 270 when left un-corrected.

Figure 3:
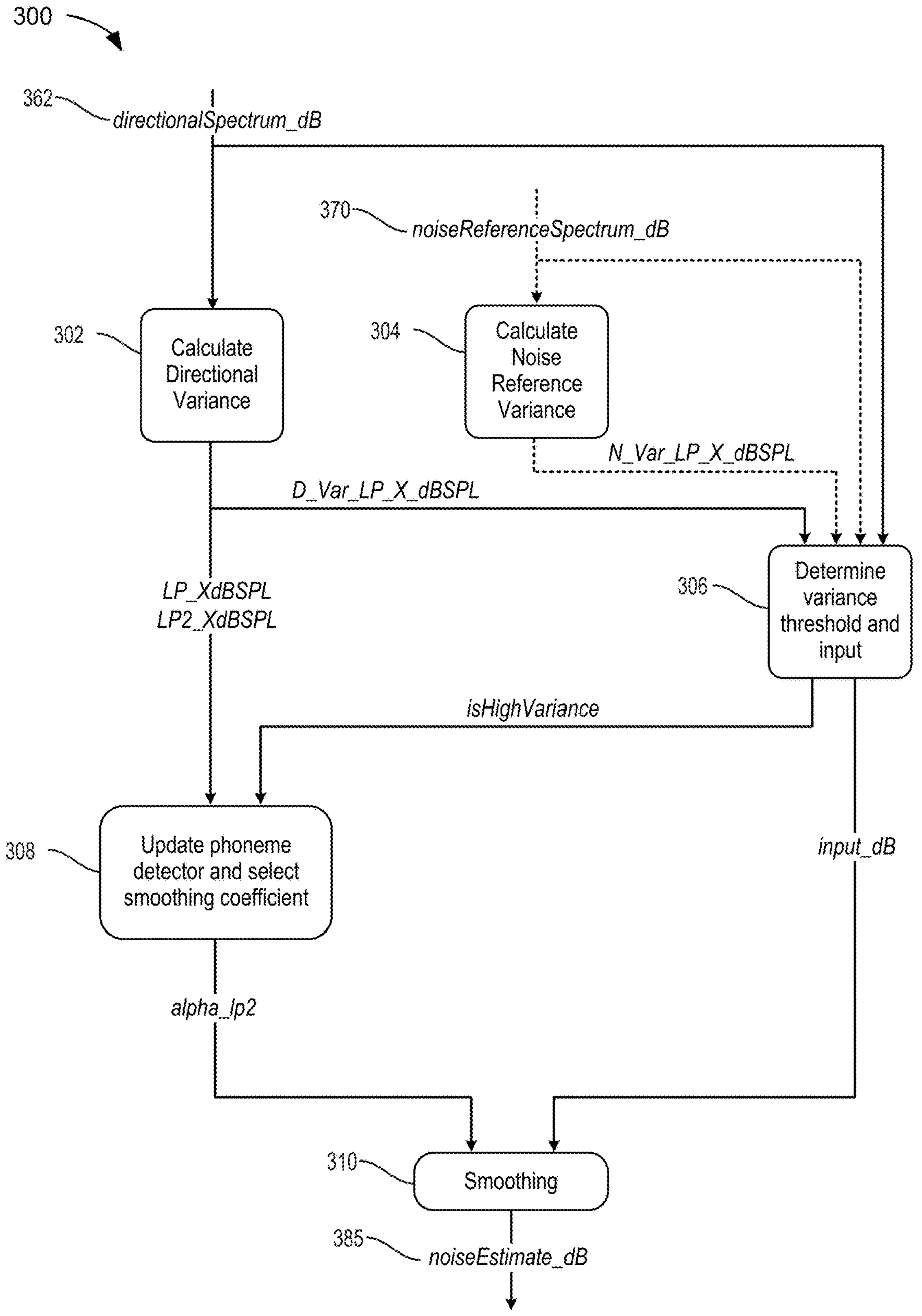
FIG. 3 is a flow diagram illustrating an example of a process for estimating noise using a directional signal and a noise reference signal, in accordance with some examples.

FIG. 3 is a flow diagram illustrating an example of a process 300 that can be used to estimate noise or otherwise perform noise estimation for one or more audio inputs (e.g., including to perform environmental noise reduction (ENR), among various other types of noise reduction or noise processing techniques that may be utilized in combination with aspects of the present disclosure).

In one illustrative example, the noise estimation process 300 of FIG. 3 can be performed based on using a directional signal 362 (or spectrum thereof) and a constructed noise reference 370 (or spectrum thereof) that is associated with the directional signal 362, to thereby generate a noise estimate 385. The noise estimate 385 may also be referred to as an estimated noise or estimated noise signal, and is shown in FIG. 3 as the estimated noise "noiseEstimate_dB" 385.

In some aspects, the directional signal 362 (e.g., shown in FIG. 3 as the "directionalSpectrum_dB" 362) can be the same as or similar to the directional signal 262 of FIG. 2. Similarly, the constructed noise reference 370 (e.g., shown in FIG. 3 as the "noiseReferenceSpectrum_dB") can be the same as or similar to the constructed noise reference 270 of FIG. 2. In one illustrative example, the noise estimation process 300 of FIG. 3 can be implemented in combination with the audio processing system 200 of FIG. 2. For example, the noise estimation process 300 can be a downstream process, such as an ENR process, that is performed in combination with and/or utilizing the output signals from the audio processing system 200. For instance, the process 300 can be used to estimate noise and generate as output the noise estimate 385 based on the directional signal 262 and the noise reference signal 270 that are depicted in and described above with respect to FIG. 2. In some embodiments, the directional signal 362 can be provided as input to the noise estimation process 300 of FIG. 3 as a frequency spectrum of a directional signal (e.g., frequency spectrum of the directional signal 262 of FIG. 2, etc.), and the corresponding constructed noise reference 370 can be a noise reference that is associated with the directional signal input, and which is itself provided as input to the noise estimation process 300 as a frequency spectrum of the noise reference signal.

The noise estimation process 300 can be performed periodically. In some aspects, the noise estimation process 300 can be implemented or performed by a noise estimation engine and/or ENR system that is associated with (e.g., downstream of) the audio processing system 200 of FIG. 2. In some examples, the noise estimation process 300 can be performed at a periodicity or time step interval of 1.3 milliseconds (ms), to thereby generate an output indicative of the current noise estimate 385 every 1.3 ms, although it is appreciated that various other periodicities and/or time step interval values may also be utilized without departing from the scope of the present disclosure.

As contemplated herein, for each time step or period (e.g., with the configured periodicity for noise estimation, such as 1.3 ms, etc.), the noise estimation process 300 can include performing one or more (or all) of the following steps:

Step 1: At block 302, the variance of the spectrum of the directional signal can be estimated as D_VAR_LP_XdBSPL. For example, block 302 can utilize the input directional spectrum 362 to calculate and generate as output information indicative of a calculated directional variance, D_VAR_LP_XdBSPL, corresponding to the directional spectrum input 362.

At block 304, the variance of the spectrum of the noise reference signal can be estimated as N_VAR_LP_XdBSPL. For example, block 304 can utilize the input noise reference spectrum 370 to calculate and generate as output information indicative of a calculated noise reference variance, N_VAR_LP_XdBSPL, corresponding to the noise reference spectrum input 370.

The directional variance and the noise reference variance can be estimated in parallel or can be estimated separately. In some examples, a single variance estimation engine or variance estimation operation can be used to calculate the directional variance 302 and the noise reference variance 304 serially (e.g., consecutively). In some examples, two separate variance estimation engines or variance estimation operations (which may be the same as or similar to one another) can be used to calculate the directional variance 302 and the noise reference variance 304 serially or in parallel. In some embodiments, the variance estimation(s) performed at blocks 302 and/or 304 can be based on the respective frequency spectra 362 and 370 received for the directional and noise reference signals at the current time step, and one or more previous frequency spectra received for the directional and noise reference signals in one or more previous time steps of the noise estimation process 300.

Step 2: At block 306, the value of a variance threshold to be used in a phoneme detector can be calculated. For example, at block 306, the noise estimation process 300 can include determining a variance threshold and one or more inputs for a phoneme detector that is also associated with the noise estimation process 300 of FIG. 3 and/or that is associated with the audio processing system 200 of FIG. 2. In one illustrative example, the variance threshold calculation or estimation 306 can be performed based on the frequency spectrum of the directional signal 362, the frequency spectrum of the constructed noise reference 370, the calculated directional variance 302, and the calculated noise reference variance 304.

For instance, at block 306 of the noise estimation process 300, the variance threshold value for the phoneme detector can be calculated based on receiving as input the directional signal frequency spectrum (directionalSpectrum_dB), the noise reference signal frequency spectrum (noiseReferenceSpectrum_dB), the directional variance (D_VAR_LP_XdBSPL), and the noise reference variance (N_VAR_LP_XdBSPL).

In particular, if the directional variance (D_VAR_LP_XdBSPL) is sufficiently larger than the noise reference variance (N_VAR_LP_XdBSPL), this is likely indicative of speech being present in the audio data captured by the front microphone (e.g., in the audio data or directional frequency spectrum corresponding to the front microphone 210 of FIG. 2). In such an example, the variance threshold to be used in the phoneme detector can be set to a relatively low value.

Otherwise (e.g., if the directional variance D_VAR_LP_XdBSPL is not sufficiently larger than the noise reference variance N_VAR_LP_XdBSPL, the variance threshold to be used in the phoneme detector can be set to a relatively high value (e.g., corresponding to the output path "isHighVariance" from block 306 to block 308.

In some examples, the variance threshold determination of block 306 can generate as output the "isHighVariance"

indication, which in some cases can be a binary indication of high variance (e.g., if the directional variance is greater than the noise reference variance by an amount greater than or equal to a configured threshold, the output "isHighVariance" is set as true; if the directional variance is not greater than the noise reference variance by an amount greater than or equal to the configured threshold, the output "isHighVariance" can be set as false (or may be not transmitted, etc.)). In some cases, the output of the variance threshold determination of block 306 can be indicative of the magnitude of the difference between the directional variance and the noise reference variance, and the phoneme detector update block 308 can use the difference information or difference value between the directional variance and the noise reference variance to determine and configured an updated phoneme detector threshold.

In another example, the phoneme detector update block 308 can receive the "isHighVariance" indication output from the variance threshold determination block 306, and can calculate or otherwise configure the updated phoneme detector threshold value accordingly (e.g., if the directional variance D_VAR_LP_XdBSPL is sufficiently larger than the noise reference variance N_VAR_LP_XdBSPL, there is likely speech present in the front direction and/or the audio data captured by the front microphone, and the phoneme detector update block 308 can determine and configure for the phoneme detector a relatively low threshold value based on isHighVariance=True). In another example, if the phoneme detector update block 308 receives an indication of isHighVariance=False (or does not receive the isHighVariance indication as output from the variance threshold determination block 306), the phoneme detector update block 308 may determine and configure a relatively high threshold value for the phoneme detector of Step 3: An input to a final smoothing step (e.g., block 310) can be determined as a weighted sum of the spectrum of the directional signal directionalSpectrumdB and the spectrum of the noise reference noise ReferenceSpectrumdB. In one illustrative example, the weight(s) used to determine the weighted sum are proportional to the variance of the spectrum of the directional signal (e.g., the weights are proportional to D_VAR_LP_XdBSPL). For example, if the variance of the spectrum of the directional signal is large (i.e., if D_VAR_LP_XdBSPL is large), the input to the final smoothing step of block 310 will include mostly the spectrum of the noise reference (noise Reference SpectrumdB), because the spectrum of the directional signal likely contains target speech.

Step 4: The phoneme detector is updated dependent on the variance of the spectrum of the directional signal (D_VAR_LP_XdBSPL), and the variance threshold chosen at block 306/step 2, as described above. For example, the phoneme detector is updated dependent on D_VAR_LP_XdBSPL and a relatively low variance threshold value when it is determined at block 306/step 2 that the directional variance is sufficiently larger than the noise reference variance (e.g., when speech is likely present at the front).

The phoneme detector is updated dependent on D_VAR_LP_XdBSPL and a relatively high variance threshold value when it is determined at block 306/step 2 that the directional variance is not sufficiently larger than the noise reference variance (e.g., when it is not determined that speech is likely present at the front).

Step 5: In addition to updating the phoneme detector (as described above with reference to step 4 and block 308), at block 308 the noise estimation process 300 can further include selecting a smoothing coefficient. The selected smoothing coefficient determined at block 308 can be subsequently applied in the smoothing operation of block 310.

Step 6: At block 310, a noise estimate (e.g., the output of smoothing operation 310, depicted in FIG. 3 as noiseEstimatedB) can be updated as a first-order recursion. For example, noiseEstimatedB can be updated as a first-order recursion using the input to the smoothing operation 310 as determined at step 3 (e.g., using the inputdB depicted in FIG. 3 as being provided from block 306 to the smoothing operation of block 310) and using the smoothing coefficient determined at step 5 (e.g., using the alpha Ip2 depicted in FIG. 3 as being provided from block 308 to the smoothing operation of block 310). For example, the first-order recursion can be implemented for a current time step n of the noise estimation process 300 to determine an updated value corresponding to noiseEstimatedB (n) by using the inputdB (n) and alpha Ip2 (n) values determined at the current time step to recursively update the noiseEstimatedB (n−1) from the previous time step, etc. It is noted that other recursive updates and recursive processes may additionally be implemented to determine an updated noiseEstimatedB without departing from the scope of the present disclosure.

In some aspects, the systems and techniques described herein can be used to generate a constructed noise reference signal that corresponds to a difference between an omni-directional signal and a bi-directional signal, such that the constructed noise reference signal has a null (e.g., low) sensitivity towards the front direction (and/or towards a particular direction that corresponds to a likely orientation of target speech or other focus of a hearing device wearer's attention). In some embodiments, the constructed noise reference signal can be determined as a difference between an omni-directional and bi-directional signal, wherein both the omni-directional and bi-directional signals are determined using a dual-microphone array, such as an ADM (e.g., such as the dual-microphone array/ADM depicted in the example of FIG. 2). In other example, the systems and techniques include generating a constructed noise reference signal for any multi-microphone hearing solution, wherein a given multi-microphone hearing solution is associated with or otherwise used to generate the aforementioned omni-directional signal and bi-directional signal described above. For instance, a multi-microphone hearing solution can include, but is not limited to, a binaural pair of hearing aids, a hearing aid combined with an external device such as a companion microphone or smartphone, etc. In one illustrative example, the systems and techniques described herein for determining a constructed noise reference and/or generating an estimated noise level based on the constructed noise reference can be implemented using the contact hearing system 100 described above with respect to FIG. 1.

The systems and techniques described herein can further be used to determine an estimated noise level based on the constructed noise reference, wherein the estimated noise level is recursively updated based on a variance associated with a directional signal and a variance threshold determined based on comparing the directional variance to a noise reference variance. The directional variance and the determined variance threshold can be used to update or otherwise configure a phoneme detector. A smoothing coefficient can be selected and provided to a smoothing operation that is implemented to perform a first-order recursion to update a noise estimate at each given time step of a plurality of time steps. The input to the smoothing operation can additionally include a weighted sum of the spectrum of the directional signal and the spectrum of the constructed noise reference signal. In some embodiments, the weight(s) used for the weighted sum can be proportional to the variance of the spectrum of the directional signal (e.g., proportional to the directional variance).

Figure 4:
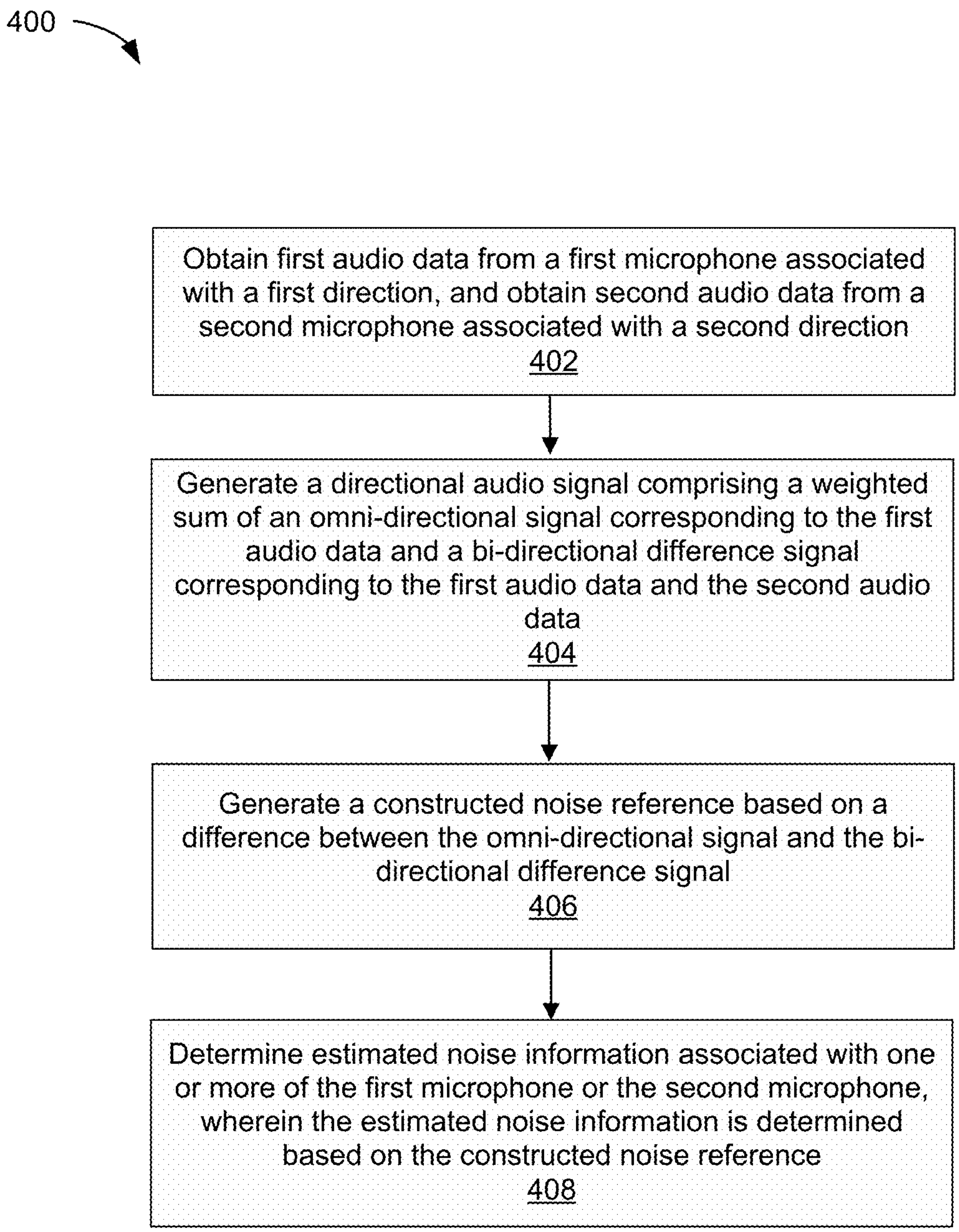
FIG. 4 is a flowchart illustrating an example of a process for noise estimation, in accordance with some examples.

FIG. 4 is a flow chart diagram illustrating an example of a process 400 for processing audio data. For example, the process 400 can be a process for processing audio data obtained from two or more microphones to generate a noise reference signal and/or a noise estimate based on the audio data from the two or more microphones. The process 400 can be performed by a computing device or apparatus or a component or system (e.g., one or more chipsets, one or more processors such as one or more CPUs, DSPs, NPUs, NSPs, microcontrollers, ASICs, FPGAs, programmable logic devices, discrete gates or transistor logic components, discrete hardware components, etc., any combination thereof, and/or other component or system) of the computing device or apparatus. The operations of the process 400 may be implemented as software components that are executed and run on one or more processors (e.g., including one or more processors, DSPs, NPUs, noise estimation systems, etc., included in the audio processing device 500 of FIG. 5; the processor 610 of FIG. 6 or other processor(s), etc.).

At block 402, the computing device (or component thereof) can obtain first audio data from a first microphone associated with a first direction, and obtain second audio data from a second microphone associated with a second direction.

At block 404, the computing device (or component thereof) can generate a directional audio signal comprising a weighted sum of an omni-directional signal corresponding to the first audio data and a bi-directional difference signal corresponding to the first audio data and the second audio data.

For example, the directional audio signal can be associated with a directional sensitivity pattern oriented in a first direction, and the constructed noise reference can be associated with the same directional sensitivity pattern oriented in a second direction opposite from the first direction.

In some cases, the directional audio signal is associated with a first directional sensitivity pattern and the constructed noise reference is associated with a second directional sensitivity pattern different from the first directional sensitivity pattern. In some cases, at block 404, the computing device can be further configured to determine a sensitivity difference between the first directional sensitivity pattern associated with the directional audio signal and the second directional sensitivity pattern associated with the constructed noise reference, and to apply a correction to one or more of the directional audio signal or the constructed noise reference, based on the determined sensitivity difference.

In some examples, the bi-directional difference signal is determined based on one or more of: a difference between the second audio data from the second microphone and the first audio data from the first microphone, or a difference between a respective scaled or amplified representation of the second audio data and a respective scaled or amplified representation of the first audio data.

In some examples, the computing device (or component thereof) can be configured to integrate the bi-directional difference signal over a configured time window to thereby generate an integrated bi-directional difference signal information, wherein the configured time window associated with the integration corresponds to an update periodicity for the constructed noise reference signal. In some aspects, the update periodicity is less than 3 milliseconds.

In some examples, the computing device (or component thereof) can be configured to generate the omni-directional signal based on applying a configured omni-directional scaling factor to the first audio data, to thereby obtain a scaled first audio data, and further based on processing the scaled first audio data using a variable gain amplifier configured with an omni-directional microphone weighting, to thereby generate the omni-directional signal.

In some cases, the omni-directional microphone weighting used to configure the variable gain amplifier is determined based on a joint optimization between a representation of the first audio data associated with the first microphone, and a representation of the second audio data associated with the second microphone. In some examples, the representation of the first audio data and the scaled first audio data are the same, and the representation of the second audio data comprises an integrated version of the bi-directional difference signal over a configured time window.

At block 406, the computing device (or component thereof) can generate a constructed noise reference based on a difference between the omni-directional signal and the bi-directional difference signal.

In some cases, the constructed noise reference comprises a weighted difference between an amplified version of the omni-directional signal and an amplified version of the bi-directional difference signal. In some examples, the constructed noise reference is generated with a null sensitivity in a direction corresponding to one or more of: the first direction associated with the first microphone and the first audio data, or an expected direction of a target speaker.

At block 408, the computing device (or component thereof) can determine estimated noise information associated with one or more of the first microphone or the second microphone, wherein the estimated noise information is determined based on the constructed noise reference.

For example, determining the estimated noise information can include determining a directional signal variance based on a frequency spectrum of the directional audio signal, and can further include determining a noise reference variance based on a frequency spectrum of the constructed noise reference, wherein the directional signal variance and the noise reference variance are estimated in parallel or are estimated in series.

In some cases, determining the estimated noise information further includes comparing a variance difference between the directional signal variance and the noise reference variance to a configured threshold value, and configuring a variance threshold value of a phoneme detector based on the comparison, wherein: a relatively large variance difference corresponds to configuring a relatively low variance threshold value of the phoneme detector, and a relatively small variance difference corresponds to configuring a relatively high variance threshold value of the phoneme detector.

In some examples, the relatively large variance difference between the directional signal variance and the noise reference variance is indicative of a presence of speech information from a target speaker or speech source located in the first direction. In some cases, determining the estimated noise information comprises performing smoothing of a weighted sum of the frequency spectrum of the directional audio signal with the frequency spectrum of the constructed noise reference to thereby generate the estimated noise information. In some examples, a weight associated with the frequency spectrum of the directional audio signal within the weighted sum is inversely proportional to the directional signal variance.

In some cases, block 408 can further include determining one or more smoothing coefficients based on one or more of the directional signal variance, the noise reference variance, or the variance threshold value, and further configuring the phoneme detector using the determined one or more smoothing coefficients. In some cases, block 408 can further include recursively updating the estimated noise information to thereby generate updated estimated noise information, wherein the recursively updating is based on the weighted sum and the determined one or more smoothing coefficients.

In some examples, the first microphone is a front-facing microphone of a hearing device, and the first direction is a front direction of the hearing device. In some examples, the second microphone is a rear-facing microphone of a hearing device, and the second direction is a rear direction of the hearing device. In some cases, the first microphone and the second microphone are included in a dual-microphone array of a hearing device or are included in a multi-microphone array of a hearing device comprising three or more microphones.

Figure 5:
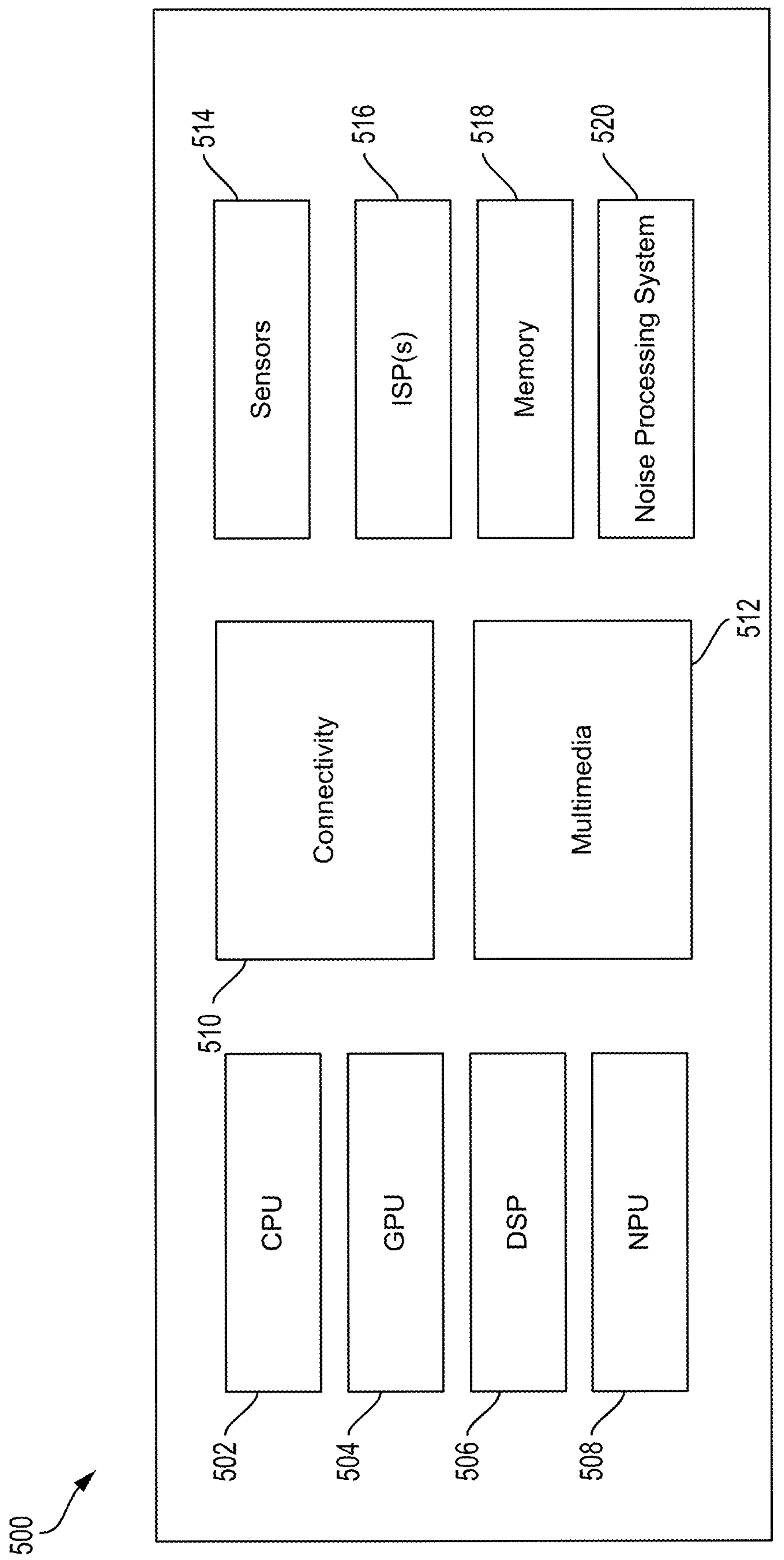
FIG. 5 is a block diagram illustrating example components of an audio processing device, in accordance with some examples.

FIG. 5 illustrates an example implementation of a system-on-a-chip (SoC) 500 which can be included in or used to implement an audio processing device, which may include a central processing unit (CPU) 502 or a multi-core CPU, configured to perform one or more of the functions described herein. Parameters or variables (e.g., neural signals and synaptic weights), system parameters associated with a computational device (e.g., neural network with weights), delays, frequency bin information, task information, among other information may be stored in a memory block associated with a neural processing unit (NPU) 508, in a memory block associated with a CPU 502, in a memory block associated with a graphics processing unit (GPU) 504, in a memory block associated with a digital signal processor (DSP) 506, in a memory block 518, and/or may be distributed across multiple blocks. Instructions executed at the CPU 502 may be loaded from a program memory associated with the CPU 502 or may be loaded from a memory block 518.

The SoC 500 may also include additional processing blocks tailored to specific functions, such as a GPU 504, a DSP 506, a connectivity block 510, which may include fifth generation (5G) connectivity, fourth generation long term evolution (4G LTE) connectivity, Wi-Fi connectivity, USB connectivity, Bluetooth connectivity, and the like, and a multimedia processor 512 that may, for example, detect and recognize gestures, speech, and/or other interactive user action(s) or input(s). In one implementation, the NPU 508 is implemented in the CPU 502, DSP 506, and/or GPU 504. The SoC 500 may also include a sensor processor 514, image signal processors (ISPs) 516, and/or a noise processing system 520. In one illustrative example, the noise processing system 520 can be the same as or similar to (or may otherwise implement) some or all of the audio processing system 200 of FIG. 2, the noise reference signal generation/estimation process 300 of FIG. 3, etc. In some examples, the sensor processor 514 can be associated with or connected to one or more sensors for providing sensor input(s) to sensor processor 514. For example, the one or more sensors and the sensor processor 514 can be provided in, coupled to, or otherwise associated with a same computing device.

In some examples, the one or more sensors can include one or more microphones for receiving sound (e.g., an audio input), including sound or audio inputs that include one or more speech signals or speech components, and one or more noise signals or noise components. In some cases, the sound or audio input received by the one or more microphones (and/or other sensors) may be digitized into data packets for analysis and/or transmission. The audio input may include ambient sounds in the vicinity of a computing device associated with the SoC 500 and/or may include speech from a user of the computing device associated with the SoC 500. In some cases, a computing device associated with the SoC 500 can additionally, or alternatively, be communicatively coupled to one or more peripheral devices (not shown) and/or configured to communicate with one or more remote computing devices or external resources, for example using a wireless transceiver and a communication network, such as a cellular communication network. SoC 500, DSP 506, NPU 508 and/or noise processing system 520 may be configured to perform audio signal processing. For example, the noise processing system 520 may be configured to perform audio signal processing for noise detection and/or noise reduction of a device including the SoC 500 and/or including the noise processing system 520.

Figure 6:
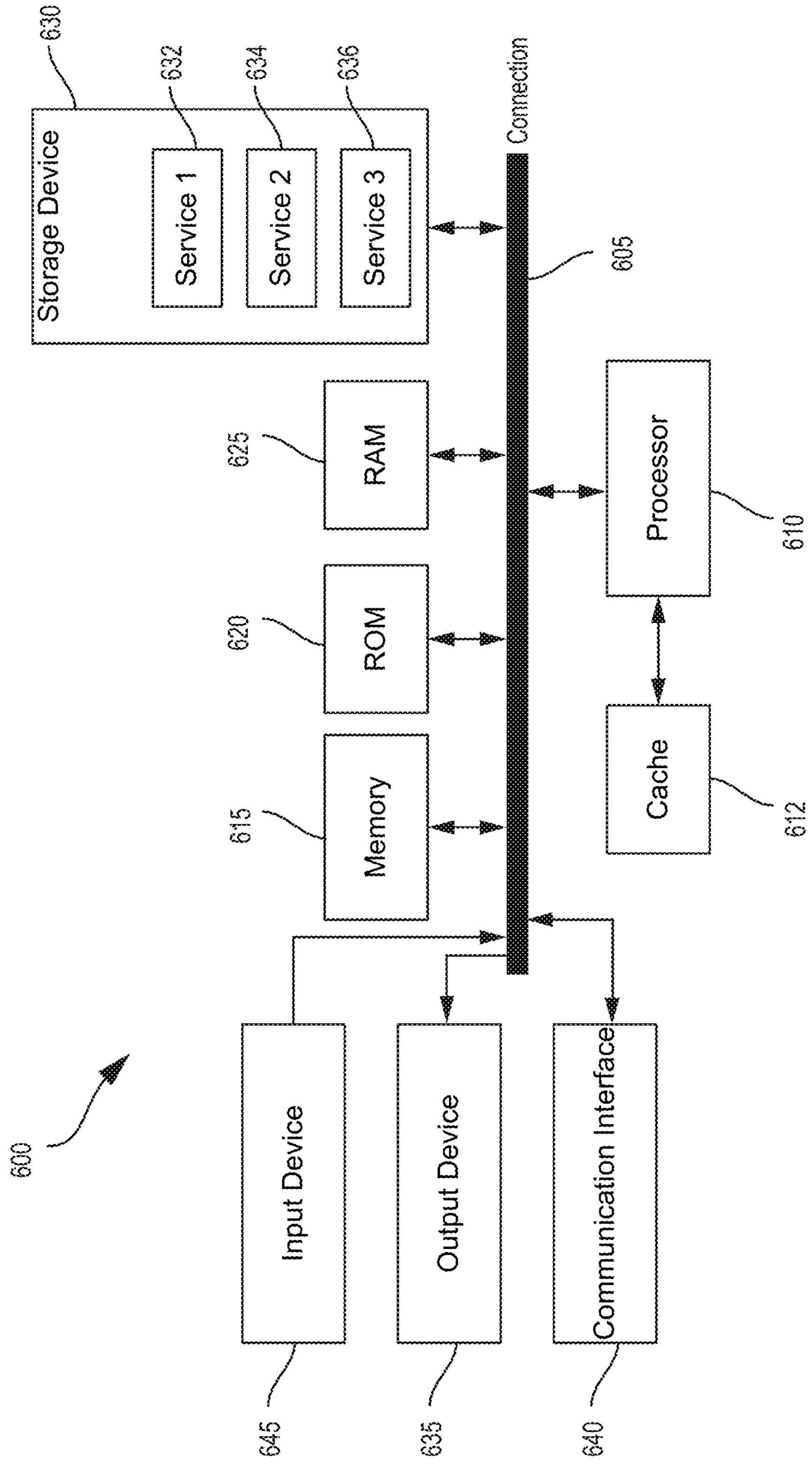
FIG. 6 is a block diagram illustrating an example of a computing system for implementing certain aspects described herein.

FIG. 6 is a diagram illustrating an example of a system for implementing certain aspects of the present technology. In particular, FIG. 6 illustrates an example of computing system 600, which may be for example any computing device making up internal computing system, a remote computing system, a camera, or any component thereof in which the components of the system are in communication with each other using connection 605. Connection 605 may be a physical connection using a bus, or a direct connection into processor 610, such as in a chipset architecture. Connection 605 may also be a virtual connection, networked connection, or logical connection.

In some aspects, computing system 600 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 600 includes at least one processing unit (CPU or processor) 610 and connection 605 that communicatively couples various system components including system memory 615, such as read-only memory (ROM) 620 and random-access memory (RAM) 625 to processor 610. Computing system 600 may include a cache 614 of high-speed memory connected directly with, in close proximity to, or integrated as part of processor 610.

Processor 610 may include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which may represent any number of input mechanisms, such as a microphone for speech, a touch-sensitive screen for gesture or graphical input, keyboard, mouse, motion input, speech, etc. Computing system 600 may also include output device 635, which may be one or more of a number of output mechanisms. In some instances, multimodal systems may enable a user to provide multiple types of input/output to communicate with computing system 600.

Computing system 600 may include communications interface 640, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 630 may include software services, servers, services, etc., that when the code that defines such software is executed by the processor 610, it causes the system to perform a function. In some aspects, a hardware service that performs a particular function may include the software component stored in a computer-readable medium in connection with the necessary hardware components, such as processor 610, connection 605, output device 635, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general-purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

What is claimed is:

1. A method for processing audio data, the method comprising:

obtaining first audio data from a first microphone associated with a first direction, and obtaining second audio data from a second microphone associated with a second direction;

generating a directional audio signal comprising a weighted sum of an omni-directional signal corresponding to the first audio data and a bi-directional difference signal corresponding to the first audio data and the second audio data;

generating a constructed noise reference based on a difference between the omni-directional signal and the bi-directional difference signal; and determining estimated noise information associated with one or more of the first microphone or the second microphone, wherein the estimated noise information is determined based on the constructed noise reference.

2. The method of claim 1, wherein the bi-directional difference signal is determined based on one or more of: a difference between the second audio data from the second microphone and the first audio data from the first microphone, or a difference between a respective scaled or amplified representation of the second audio data and a respective scaled or amplified representation of the first audio data.

3. The method of claim 1, further comprising integrating the bi-directional difference signal over a configured time window to thereby generate an integrated bi-directional difference signal information, wherein the configured time window associated with the integration corresponds to an update periodicity for the constructed noise reference signal.

4. The method of claim 3, wherein the update periodicity is less than 3 milliseconds.

5. The method of claim 1, further comprising generating the omni-directional signal based on:

applying a configured omni-directional scaling factor to the first audio data, to thereby obtain a scaled first audio data; and processing the scaled first audio data using a variable gain amplifier configured with an omni-directional microphone weighting, to thereby generate the omni-directional signal.

6. The method of claim 5, wherein the omni-directional microphone weighting used to configure the variable gain amplifier is determined based on a joint optimization between a representation of the first audio data associated with the first microphone, and a representation of the second audio data associated with the second microphone.

7. The method of claim 6, wherein:

the representation of the first audio data and the scaled first audio data are the same; and the representation of the second audio data comprises an integrated version of the bi-directional difference signal over a configured time window.

8. The method of claim 1, wherein the constructed noise reference comprises a weighted difference between an amplified version of the omni-directional signal and an amplified version of the bi-directional difference signal.

9. The method of claim 1, wherein the constructed noise reference is generated with a null sensitivity in a direction corresponding to one or more of: the first direction associated with the first microphone and the first audio data, or an expected direction of a target speaker.

10. The method of claim 1, wherein the directional audio signal is associated with a directional sensitivity pattern oriented in a first direction, and wherein the constructed noise reference is associated with the same directional sensitivity pattern oriented in a second direction opposite from the first direction.

11. The method of claim 1, wherein: the directional audio signal is associated with a first directional sensitivity pattern and the constructed noise reference is associated with a second directional sensitivity pattern different from the first directional sensitivity pattern.

12. The method of claim 11, further comprising:

determining a sensitivity difference between the first directional sensitivity pattern associated with the directional audio signal and the second directional sensitivity pattern associated with the constructed noise reference; and applying a correction to one or more of the directional audio signal or the constructed noise reference, based on the determined sensitivity difference.

13. The method of claim 1, wherein determining the estimated noise information includes:

determining a directional signal variance based on a frequency spectrum of the directional audio signal; and determining a noise reference variance based on a frequency spectrum of the constructed noise reference, wherein the directional signal variance and the noise reference variance are estimated in parallel or are estimated in series.

14. The method of claim 13, wherein determining the estimated noise information further includes:

comparing a variance difference between the directional signal variance and the noise reference variance to a configured threshold value; and configuring a variance threshold value of a phoneme detector based on the comparison, wherein: a relatively large variance difference corresponds to configuring a relatively low variance threshold value of the phoneme detector, and a relatively small variance difference corresponds to configuring a relatively high variance threshold value of the phoneme detector.

15. The method of claim 14, wherein the relatively large variance difference between the directional signal variance and the noise reference variance is indicative of a presence of speech information from a target speaker or speech source located in the first direction.

16. The method of claim 14, wherein:

determining the estimated noise information comprises performing smoothing of a weighted sum of the frequency spectrum of the directional audio signal with the frequency spectrum of the constructed noise reference to thereby generate the estimated noise information; and a weight associated with the frequency spectrum of the directional audio signal within the weighted sum is inversely proportional to the directional signal variance.

17. The method of claim 16, further comprising:

determining one or more smoothing coefficients based on one or more of the directional signal variance, the noise reference variance, or the variance threshold value; and further configuring the phoneme detector using the determined one or more smoothing coefficients.

18. The method of claim 16, further comprising:

recursively updating the estimated noise information to thereby generate updated estimated noise information, wherein the recursively updating is based on the weighted sum and the determined one or more smoothing coefficients.

19. The method of claim 1, wherein:

the first microphone is a front-facing microphone system of a hearing device, and the first direction is a front direction of the hearing device; and the second microphone is a rear-facing microphone system of a hearing device, and the second direction is a rear direction of the hearing device.

20. The method of claim 1, wherein:

the first microphone and the second microphone are included in a dual-microphone array of a hearing device or are included in a multi-microphone array of a hearing device comprising three or more microphones;

the omni-directional signal is generated as a first combination of the first audio data and the second audio data, utilizing a first configured time delay value between the first audio data and the second audio data; and the bi-directional difference signal is generated as a second combination of the first audio data and the second audio data, utilizing a second configured time delay value between the first audio data and the second audio data.

* * * * *